INVENTOR.
ROBERT C. PAULSEN

INVENTOR
ROBERT C. PAULSEN

June 28, 1960 R. C. PAULSEN 2,943,194
REGISTRATION CONTROL
Filed Sept. 15, 1954 3 Sheets-Sheet 3

INVENTOR
ROBERT C. PAULSEN
BY
Pennie, Edmonds, Morton, Barrows & Taylor
ATTORNEYS

United States Patent Office 2,943,194
Patented June 28, 1960

2,943,194

REGISTRATION CONTROL

Robert C. Paulsen, Boonton, N.J., assignor to International Business Machines Corporation, New York, N.Y., a corporation of New York Filed Sept. 15, 1954, Ser. No. 456,124

3 Claims. (Cl. 250—27)

This invention relates to a novel registration control which provides timing and leveling adjustments for the input voltages of electronic registers and the like.

More specifically the invention relates to method and apparatus for securing accurately timed responses in electronic circuits responsive to applied voltages of varying values in apparatus, such, for example, as the computing machine described and claimed in the application of Arthur H. Dickinson, filed April 16, 1954, Ser. No. 423,774.

In the apparatus therein described numerical values which are transmitted to the computing mechanism are recorded on magnetic cards in the form of magnetized areas such that, when the cards are fed past the pick-up mechanism of the computing machine the input voltages representing the different digits will differ in the rate of change from one predetermined value to another during the recording interval.

The computing machine described in the above mentioned application comprises a source of accurately timed impulses so synchronized with the card feed that a definite number of impulses are impressed on the pick-up circuits of the machine during the passage of the magnetized areas past the pick-up heads. The triggers between the pick-up circuits and computing instrumentalities are set to respond when the voltage induced in the pick-up circuits reaches a predetermined value and consequently the impulses delivered to the computing machine are those generated during that portion of the total interval of passage of the recorded signals remaining after the induced voltage reaches the said predetermined value.

In the production of the cards and also in the feed of the cards through the computing machine it is difficult to maintain exact precision, and there are unavoidable slight variations in the positioning of the recordings on the card, in the minimum and maximum intensity of the applied magnetizing force and in the uniformity of the rate at which the magnetizing force is increased.

For accurate operation of the computing mechanism it is desirable that these inaccuracies be eliminated as far as possible, and by the invention hereinafter described exactly timed responses of identical character are obtained from recordings presenting a fairly wide range of variations.

In the acompanying drawings and the following specification I have disclosed my invention as incorporated in the computing machine of the above referred to application, and I will thereafter point out how the principle of my invention may be applied to other types of apparatus for leveling out the variants in various types of electronic circuits.

In the computing machine forming the subject-matter of the above identified application the recordings of the various numerical values produce in the pick-up circuits responses different from one another in the rate at which the induced voltage changes from zero to a negative maximum, and in that application the responses in the several digital values are represented by wave forms consisting of a portion of changing voltage and a portion of uniform voltage, the respective portions varying inversely, depending upon the particular digit represented. Thus, in Fig. 1 I have shown the wave form of the response induced for the digit 7. This consists of a tapered portion A representing the period of changing voltage and a portion B of uniform voltage. Due to the inaccuracy in card feed, etc., the responses may vary in timed sequence and may also vary somewhat in the rate of voltage change. Because of such inaccuracies the recordings are purposely made so that the time of passage past the recording heads and the extent of voltage change are somewhat greater than required if such inaccuracies did not occur, and my novel control circuit is employed to correctly time and adjust the control voltages induced by these magnetic recordings.

Figure 1:
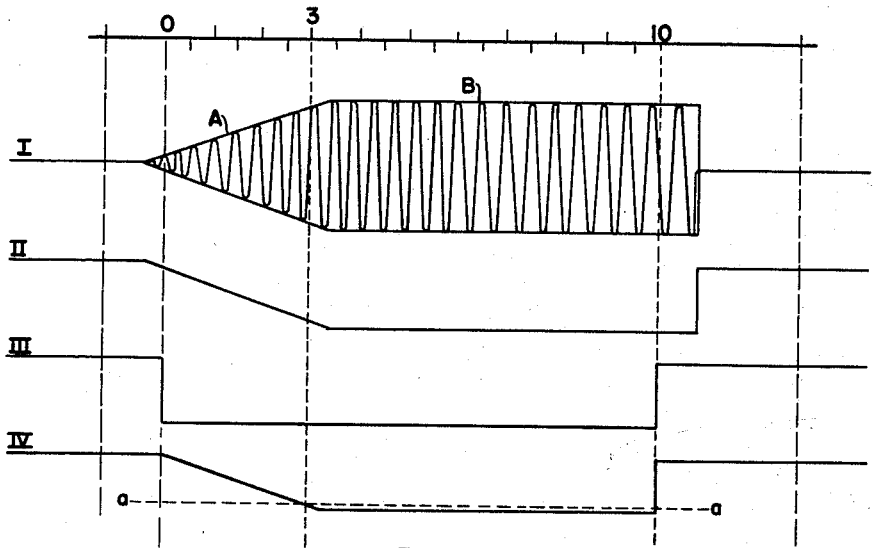
Fig. 1 is a timing chart showing one machine point of the computing machine of the above mentioned application showing the induced voltage response resulting from the passage of the magnetized area representing the digit "7" when correctly timed and recorded and the effect of the control circuit thereon.

In Fig. 1 the line I represents the continuously generated impulses. It will be observed that the wave form representing the digit "7" is of a length, when accurately recorded, for its passage past the recording head to begin somewhat in advance of the impulse marked "0" and to extend somewhat beyond the impulse marked "10." Line II in Fig. 1 represents the resulting input voltage were my registration control circuit not employed, line III represents the voltage supplied to the control circuit and line IV represents the modified input voltage which governs the operation of the computing machine. The control voltage represented by line III is accurately maintained at the values indicated and is accurately timed in synchronism with the impulses marked "0."

Figure 4:
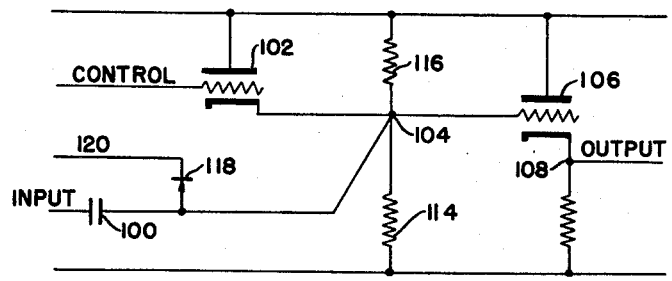
Fig. 4 is a wiring diagram showing the control circuit.

Referring to Fig. 4 the input voltage generated by the record medium (lines II, Fig. 1) is applied to one terminal of condenser 100. A control voltage sufficient to cause triode 102 to conduct is applied to its grid. The other side of condenser 100 is connected to point 104 which is held at a constant level due to the cathode follower action of triode 102. The grid of cathode follower 106 is connected to point 104 and point 108 is the output of the modified voltage represented by line IV in Fig. 1.

When the input voltage is applied the condenser 100 begins to charge. This is so because one plate is connected to the point 104 which is being held at a fixed level as a result of conduction of triode 102. Point 104 is a low impedance connection for condenser 100, a characteristic of cathode follower circuits. The condenser 100 continues to charge until the abrupt change in the control voltage at impulse "0." During this interval the potential of point 104 (also point 108) does not vary. See line IV, Fig. 1. At time "0," however, the grid of triode 102 drops in potential substantially below point 104 thereby cutting off conduction of triode 102.

The impedance of point 104 is thus made relatively high. Resistors 114 and 116 are also of relatively high resistance and the capacity of condenser 100 is large. Since there is little charging of condenser 100 once the triode 102 becomes non-conductive (time "0"), point 104 begins to follow the waveform at the input. It should be understood that point 104 begins to decrease in potential at time "0" at substantially the same rate that the input decreases. It should also be clear that the said decrease commences from the initial level assumed by point 104 during the conduction of triode 102.

Line IV, Fig. 1, shows the voltage excursion of point 104 and also represents the output at point 108. Since triode 106 also operates as a cathode follower, the voltage changes of 104 are substantially duplicated at point 108. Between the time interval, impulse "0" to impulse "3" (Fig. 1) points 104 and 108 respond to the input voltage as shown by line IV, producing a waveform similar to line II but beginning at time "0" and at the normal level of the control circuit. The output voltage changes at exactly the rate of the input voltage until a value is reached somewhat less than the maximum as indicated by the dotted line $a$. This line represents the voltage at which the gate trigger of the computing machine is set. The accurately adjusted control voltage will at the rate of change corresponding to the digit "7" reach this value exactly at time "3" and seven impulses will thus be delivered to the registers. The control voltage is changed to its initial value exactly at time "10" thereby closing the gate trigger. At this time the condenser 100 must be discharged to be ready for the next operation and to facilitate the speedy discharge of the condenser there is included in the circuit a line 120 and a diode 118. Line 120 is a low impedance source of potential and is adjusted to be equal in voltage to the value normally maintained by point 104 during the time triode 106 conducts. The rate of discharge of condenser 100 depends on the impedance of the circuit diode 118 and line 120 are of low impedance and hence insures that the condenser 100 will be effectively discharged.

Figure 2:
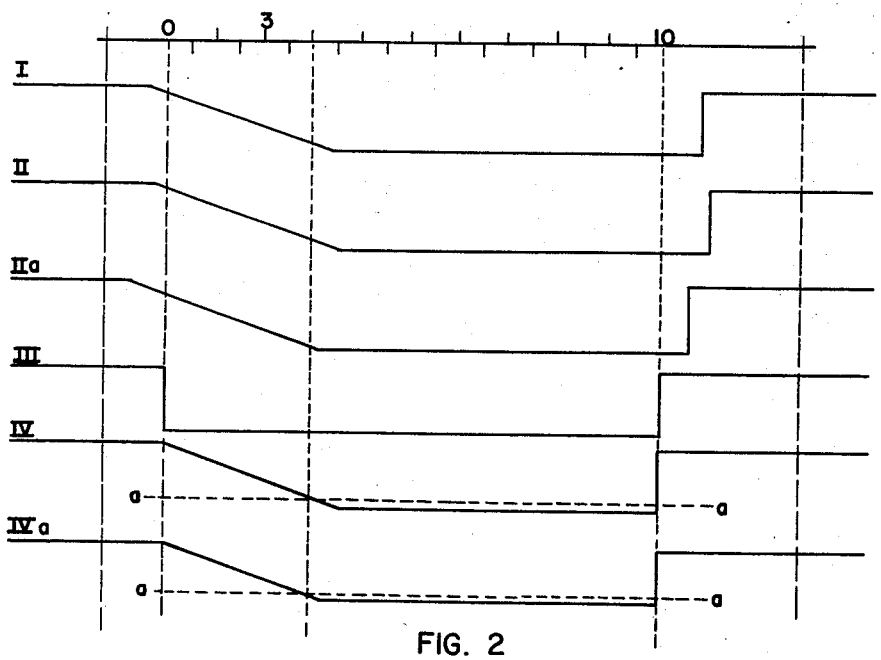
Fig. 2 shows the effect of the control circuit on responses from correctly recorded but improperly timed representations of the digit "7"

Fig. 2 shows how exactly the same wave pattern is obtained from differently timed input voltages. Line I represents a correctly timed input voltage. Line II represents a lagging input voltage and line II$^a$ an advanced input voltage. The control voltage, line III gives the corrected voltage indicated at lines IV and IV$^a$, respectively. In both cases the voltage for which the gate trigger is set is reached at precisely time "3." In both instances the control voltage begins to change at "0" time from the normal level of the control voltage but at the rate of charge of the input voltage and thus reaches the voltage for which the gate trigger is set at precisely the time "3" notwithstanding the incorrect timing of the input voltage.

Figure 3:
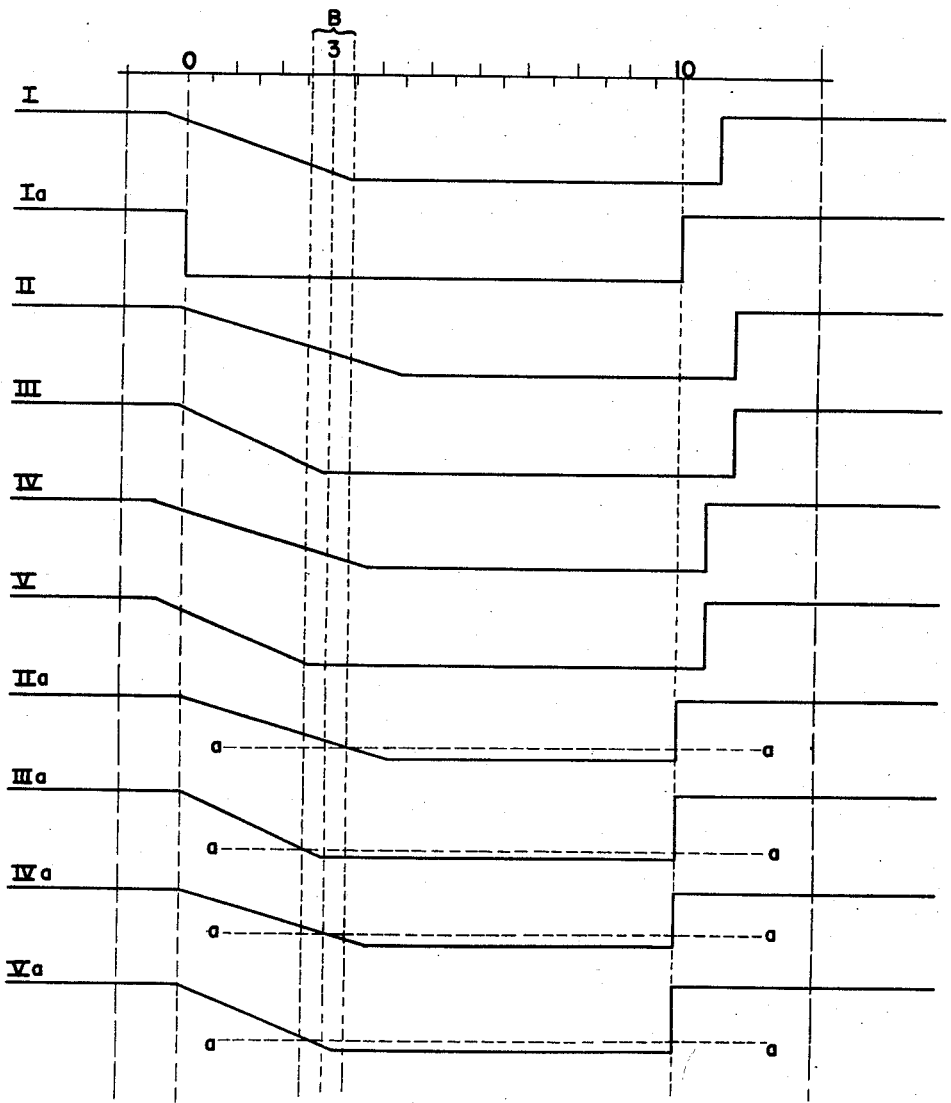
Fig. 3 shows the effect of the control circuit on responses from recordings which are both inaccurate and improperly timed.

The inaccuracy in timing may be even greater than indicated in Fig. 2 without causing error in the computing machine. The gate trigger need not be closed at exactly the time "3," which represents the peak voltage of the impulse. The registers will function accurately if the gate is closed within the interval indicated by the band "B" in Fig. 3 wherein I have shown the effect of my control circuit on input voltages which are incorrectly recorded as well as incorrectly timed. As here shown, line I represents a correctly timed and correctly recorded input voltage for the digit "7." Line I$^a$ represents the control voltage, line II represents an input voltage which not only lags but changes at a rate somewhat less than correct for digit "7." Line III represents an input voltage which lags and changes at a rate somewhat higher than correct. The input voltage represented by line IV is advanced and changes at somewhat lower rate than correct, and line V represents an advanced voltage whose rate of increase is greater than correct. Lines II$^a$, III$^a$, IV$^a$ and V$^a$ represent these respective voltages as modified by the control circuit and in all instances the gate trigger is opened within the time interval represented by band B.

Figure 5:
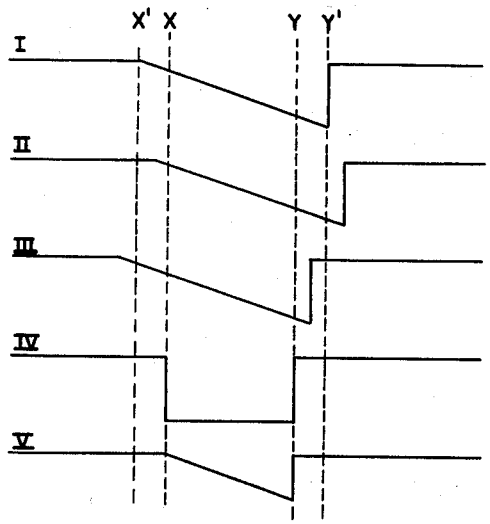
Figs. 5 and 6 show the operation of the control circuit in its general application.

Fig. 5 is a simplified diagram showing without specific application the operation of my improved control circuit in obtaining identical, accurately timed voltage patterns from differently timed input voltages.

It will be assumed that it is desired to produce an output voltage such as indicated by line V beginning at time $x$ and ending at time $y$ from an input source whose range of possible error in timing is indicated by times $x'$ and $y'$. To obtain the desired properly timed output voltage, the input voltage is, when correctly timed as indicated in line I initiated before time $x$ and continued beyond time $y$ to an extent such that incorrectly timed input voltages within the range of possible error will begin and end respectively within the time periods between $x—x'$ and $y—y'$. Line II represents a delayed input voltage; line III an advanced input voltage and line IV the control voltage. From the voltages represented by both lines II and III the same output voltage is obtained, exactly timed as indicated.

Figure 6:
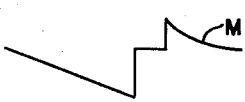

Fig. 6 shows the effect which would be produced were the discharge of condenser 100 not properly controlled. As stated above, line 120 is a low impedance source of potential and is adjusted to be equal in voltage to the value normally maintained by point 104 during the time triode 102 conducts. By virtue of its polarity in the circuit, triode 106 offers high impedance to the current flow whenever point 104 is equal to or lower than wire 120. Were it not for the action of diode 118, point 104 would rise above its normal high value when the change in the control voltage restores the input voltage to its original status, and would thereby produce a wave form such as shown at M in Fig. 6. Diode 118 is of low impedance and hence, whenever point 104 attempts to rise above its pre-selected value, diode 118 prevents positive excursions of point 104 as indicated in Fig. 6 as well as effectively discharging condenser 100 for subsequent operation.

Figure 7:
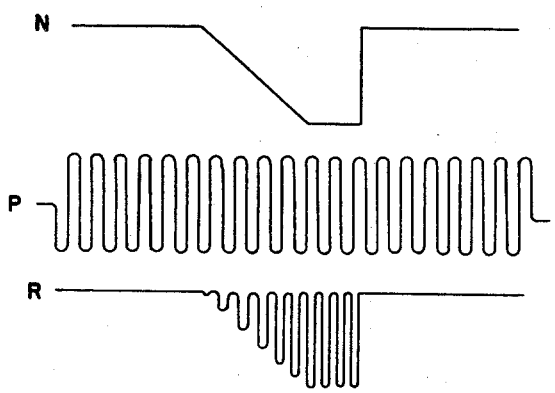
Fig. 7 illustrates the use of my control circuit for modifying an alternating voltage.

Fig. 7 illustrates another mode of operation in which an alternating voltage P is applied to the input circuit of Fig. 4. With the control voltage N applied to the grid of triode 102, point 104 will produce an envelope R, Fig. 7, of the alternating voltage which corresponds in form to the variable control voltage N. Obviously, this may be of many varied forms. Thus it may be seen, that in addition to its featured use, as a registration control, it also performs as a mixing circuit or a gate with a variable output.

Generally speaking, my control circuit operates to adjust the threshold level of a sawtooth type wave to a desired value. It also controls the time at which said sawtooth wave begins to change in potential.

This circuit may be employed in any system utilizing rates of change in control potentials. For example, it may be used in the control of sweep voltages in cathode ray devices. A free-running sawtooth generator used in such devices may produce control voltages lacking precise timing or duration. By application of this invention the element of timing can be reinstated thereby improving the inherent accuracy or stability of such devices.

Another application of this device is in circuits such as those used in radar, firing control, loran, computing, facsimile and others employing control voltages of the sawtooth type. In these circuits, it is frequently required that sawtooth waves having differentially timed thresholds be generated. By means of this device such a result is readily obtainable.

It is therefore to be understood that my invention is not limited to the specific examples herein described and claimed but includes all such modifications thereof as fall within the scope of the appended claims.

I claim:

1. A circuit for regulating the timing of applied voltages having a predetermined pattern of varying intensity comprising a point whose voltage is to be timed and regulated, an input line for the applied voltage connected to said point resistors connecting said points to circuit lines of different polarity, a triode between said point and one of said lines, a condenser in the input line to said point and means for applying a control circuit of fixed initial voltage to the grid of said triode and changing said control voltage to render said triode conducting or non-conducting.

2. The circuit of claim 1 wherein means are provided to prevent fluctuations in the voltage of the point of connection during the discharge of the condenser.

3. The circuit of claim 1 to which is added a second triode connected across said circuit lines with its grid connected to said point and an output terminal in said second triode circuit.

References Cited in the file of this patent

UNITED STATES PATENTS

| | | |
|---|---|---|
| 2,405,843 | Moe | Aug. 13, 1946 |
| 2,589,807 | Higinbotham | Mar. 18, 1952 |
| 2,671,169 | Norton | Mar. 2, 1954 |
| 2,739,236 | Holt | Mar. 20, 1956 |
| 2,743,364 | Kraft | Apr. 24, 1956 |
| 2,745,956 | Baker | May 15, 1956 |